(12) United States Patent
Lu et al.

(10) Patent No.: US 11,149,564 B2
(45) Date of Patent: Oct. 19, 2021

(54) NACELLE THRUST REVERSER COMPRESSION ROD SUPPORTING SYSTEM

(71) Applicant: ROHR, INC., Chula Vista, CA (US)

(72) Inventors: Jinqiu Lu, Murrieta, CA (US); Frank Zabatta, Chula Vista, CA (US); Travis Michael Frazier, Austin, TX (US); Karina Alejandra Hernandez, Baja California (MX)

(73) Assignee: Rohr, Inc., Chula Vista, CA (US)

( * ) Notice: Subject to any disclaimer, the term of this patent is extended or adjusted under 35 U.S.C. 154(b) by 238 days.

(21) Appl. No.: 16/450,799

(22) Filed: Jun. 24, 2019

(65) Prior Publication Data
US 2020/0400029 A1 Dec. 24, 2020

(51) Int. Cl.
| F01D 9/02 | (2006.01) |
| F01D 25/24 | (2006.01) |
| F02K 1/70 | (2006.01) |
| F02K 1/80 | (2006.01) |
| F02K 1/64 | (2006.01) |
| F02K 1/72 | (2006.01) |
| B64D 29/06 | (2006.01) |

(52) U.S. Cl.
CPC ............... *F01D 9/02* (2013.01); *B64D 29/06* (2013.01); *F01D 25/243* (2013.01); *F02K 1/64* (2013.01); *F02K 1/70* (2013.01); *F02K 1/72* (2013.01); *F02K 1/80* (2013.01); *F05D 2230/60* (2013.01)

(58) Field of Classification Search
CPC .. B64C 7/02; B64D 29/06; F02K 1/64; F02K 1/70; F02K 1/72; F02K 1/80; F05D 2230/60
See application file for complete search history.

(56) References Cited

U.S. PATENT DOCUMENTS

| 7,083,144 | B2 | 8/2006 | Howe et al. | |
| 8,226,027 | B2* | 7/2012 | Journade | B64D 33/04 244/54 |
| 8,439,308 | B2* | 5/2013 | Armstrong | G05B 21/02 244/129.4 |
| 8,573,928 | B2* | 11/2013 | Soulier | B64D 29/06 415/126 |
| 8,573,934 | B2* | 11/2013 | Soulier | B64D 29/06 415/214.1 |
| 9,470,107 | B2* | 10/2016 | Byrne | B64D 27/10 |
| 9,932,855 | B2 | 4/2018 | Byrne | |
| 10,150,568 | B2* | 12/2018 | Lu | B64D 29/00 |
| 10,605,119 | B2* | 3/2020 | Ward | F01D 25/162 |
| 10,780,987 | B2* | 9/2020 | Ratajac | E05B 9/00 |

(Continued)

OTHER PUBLICATIONS

European Patent Office, European Search Report dated Aug. 5, 2020 in Application No. 19216578.5.

*Primary Examiner* — Craig Kim

(74) *Attorney, Agent, or Firm* — Snell & Wilmer L.L.P.

(57) ABSTRACT

An aircraft nacelle arrangement includes a compression rod disposed between a first nacelle half and a second nacelle half, wherein the first nacelle half and the second nacelle half are rotatable about a hinge between a closed position and an open position, a compression rod disposed between the first nacelle half and the second nacelle half, and a mounting bracket coupled to an exhaust nozzle flange of the aircraft engine, wherein the compression rod extends through the mounting bracket.

20 Claims, 10 Drawing Sheets

(56) References Cited

U.S. PATENT DOCUMENTS

| | | | |
|---|---|---|---|
| 10,814,995 B2* | 10/2020 | West | B64D 29/02 |
| 2006/0038065 A1 | 2/2006 | Howe et al. | |
| 2011/0038725 A1* | 2/2011 | Soulier | E05C 19/08 |
| | | | 415/214.1 |
| 2012/0018005 A1 | 1/2012 | Soulier et al. | |
| 2016/0010502 A1* | 1/2016 | Byrne | F01D 25/04 |
| | | | 415/213.1 |
| 2017/0211512 A1* | 7/2017 | Lu | B64D 29/08 |

* cited by examiner

SECTION A-A

NACELLE THRUST REVERSER COMPRESSION ROD SUPPORTING SYSTEM

FIELD

The disclosure generally relates to gas turbine propulsion systems for commercial aircraft, and more particularly to the design of compression rod systems used for mounting thrust reverser halves.

BACKGROUND

Modern aircraft may utilize one or more gas turbine engines. A gas turbine engine may be housed in a nacelle. Often, the nacelle includes a thrust reverser. The thrust reverser includes an inner fixed structure (IFS) surrounding the engine which forms the interior surface of a bypass air duct through the thrust reverser. The IFS defines a core compartment that surrounds the engine. During various operating conditions, such as during reverse thrust, pressure in the duct is greater than the pressure in the core compartment around the engine. In these conditions, two IFS halves may be pushed together, i.e. inward toward the engine. In certain cases, this load may be reacted with a compression rod that extends between the two IFS halves.

SUMMARY

An aircraft nacelle arrangement is disclosed, comprising a first half comprising a first engagement feature, and a second half comprising a second engagement feature, wherein the first half and the second half are rotatable about a hinge between a closed position in which the first half and the second half enclose a portion of an aircraft engine, and an open position in which the first half and the second half are separated and allow access to the portion of the aircraft engine, a compression rod comprising a first end and a second end, wherein in response to the aircraft nacelle arrangement being in the closed position, the first end is in contact with the first engagement feature and the second end is in contact with the second engagement feature, and a first mounting bracket coupled to an exhaust nozzle flange of the aircraft engine, wherein the compression rod extends through the first mounting bracket.

In various embodiments, the aircraft nacelle arrangement further comprises a second mounting bracket coupled to the exhaust nozzle flange of the aircraft engine, wherein the compression rod extends through the second mounting bracket.

In various embodiments, the second mounting bracket is disposed circumferentially from the first mounting bracket.

In various embodiments, the aircraft nacelle arrangement further comprises a first engagement member coupled to the first end; and
a second engagement member coupled to the second end.

In various embodiments, in response to the first half being rotated about the hinge to the closed position, the first engagement member is configured to engage the first engagement feature and in response to the second half being rotated about the hinge to the closed position, the second engagement member is configured to engage the second engagement feature.

In various embodiments, at least one of the first engagement member and the second engagement member comprise at least one of a cap or a button end.

In various embodiments, the first engagement feature comprises a first cone coupled to the first half, and wherein the second engagement feature comprises a second cone coupled to the second half.

In various embodiments, the first mounting bracket extends radially outward from the exhaust nozzle flange.

An arrangement for an aircraft nacelle is disclosed, comprising a turbine engine, an exhaust assembly coupled to the turbine engine, the exhaust assembly extends aft ward from the turbine engine, an exhaust nozzle flange, whereby the exhaust assembly is coupled to the turbine engine, a compression rod disposed radially from the exhaust nozzle flange, and a first mounting bracket coupled to the exhaust nozzle flange, wherein the compression rod extends through the first mounting bracket.

In various embodiments, the arrangement further comprises a second mounting bracket coupled to the exhaust nozzle flange, wherein the compression rod extends through the second mounting bracket.

In various embodiments, the second mounting bracket is disposed circumferentially from the first mounting bracket.

In various embodiments, the arrangement further comprises a first engagement member coupled to a first end of the compression rod; and
a second engagement member coupled to a second end of the compression rod.

In various embodiments, at least one of the first engagement member and the second engagement member comprise at least one of a cap or a button end.

In various embodiments, the first mounting bracket extends radially outward from the exhaust nozzle flange.

In various embodiments, the arrangement further comprises a first half comprising a first engagement feature, and a second half comprising a second engagement feature, wherein the first half and the second half are rotatable about a hinge between a closed position in which the first half and the second half enclose a portion of the turbine engine, and an open position in which the first half and the second half are separated and allow access to the portion of the turbine engine.

In various embodiments, in response to the first half being rotated about the hinge to the closed position, the first engagement member is configured to engage the first engagement feature and in response to the second half being rotated about the hinge to the closed position, the second engagement member is configured to engage the second engagement feature.

In various embodiments, the first engagement feature comprises a first cone coupled to the first half, and wherein the second engagement feature comprises a second cone coupled to the second half.

A method for installing a compression rod is disclosed, comprising coupling a first mounting bracket to an exhaust nozzle flange of an aircraft engine, and disposing the compression rod to extend through the first mounting bracket.

In various embodiments, the method further comprises coupling a second mounting bracket to the exhaust nozzle flange, and disposing the compression rod to extend through the second mounting bracket.

In various embodiments, the method further comprises rotating a first half towards a closed position, and rotating a second half towards the closed position, wherein the compression rod is compressed between the first half and the second half in response to the first half and the second half being rotated to the closed position.

The foregoing features, elements, steps, or methods may be combined in various combinations without exclusivity, unless expressly indicated herein otherwise. These features, elements, steps, or methods as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

A thrust reverser may include a duct with an inner wall that surrounds and forms a core compartment around the engine. Variations in air pressure in the duct and in the core compartment may result in forces that need to be reacted. One method of reacting these forces in use on commercial airliners today is a compression rod. The compression rod contacts engagement points on each thrust reverser half to take compression loads between them. The compression rod is typically supported by the pylon.

A compression rod of the present disclosure is supported by a bracket mounted to an exhaust nozzle flange. In this regard, a thrust reverser of the present disclosure is coupled to the exhaust nozzle via the bracket and compression rod. In this manner, the aft compression rod support bracket may be compact, reducing overall weight and footprint of the compression rod arrangement.

Figure 1:
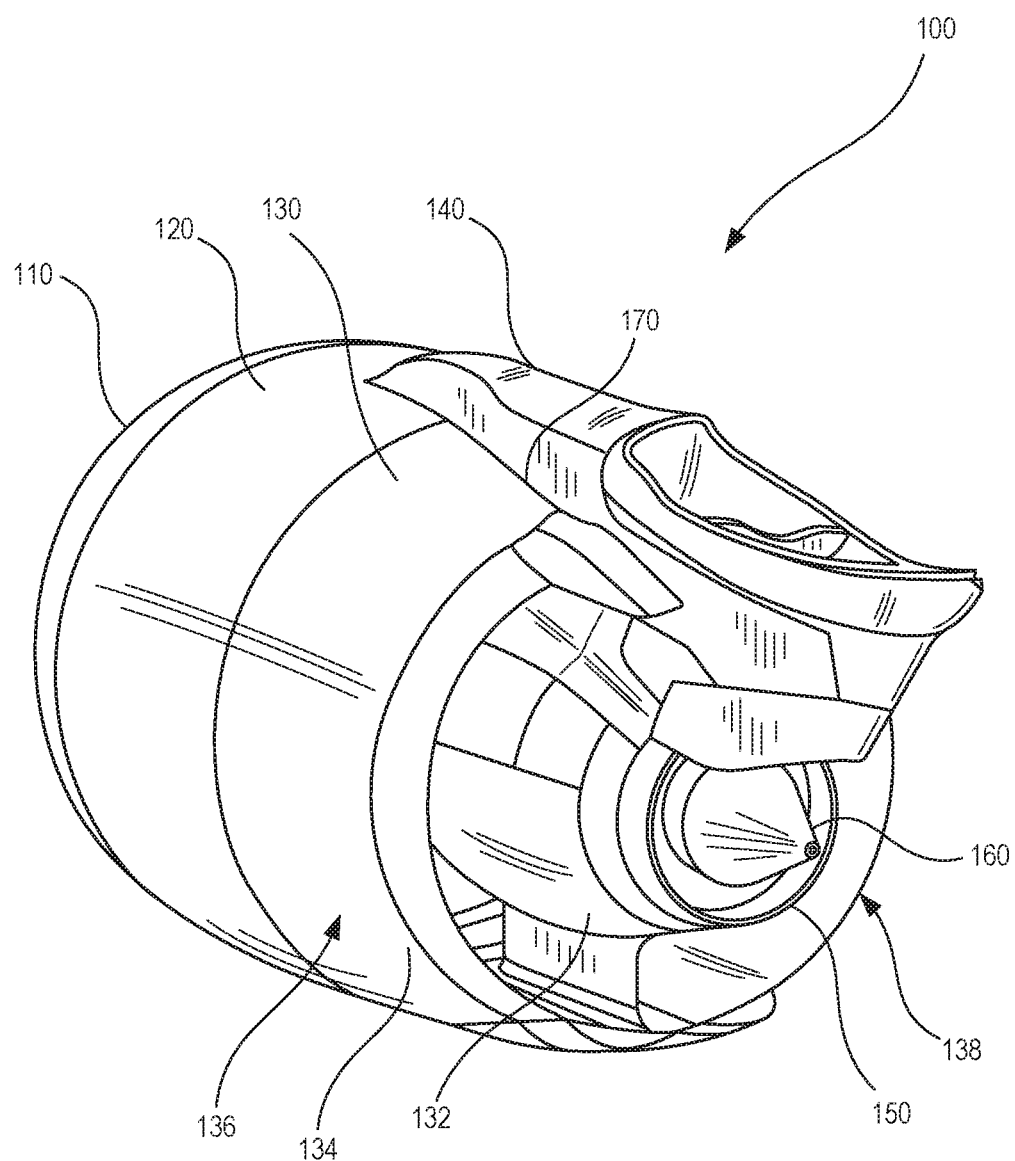
FIG. 1 illustrates a perspective view of a nacelle, in accordance with various embodiments.

Referring to FIG. 1, a nacelle 100 for a gas turbine engine is illustrated according to various embodiments. Nacelle 100 may comprise an inlet 110, a fan cowl 120, and a thrust reverser 130. Nacelle 100 may be coupled to a pylon 140, which may mount the nacelle 100 to an aircraft wing or aircraft body. Thrust reverser 130 may comprise an inner fixed structure ("IFS") 132 and an outer fixed structure ("OFS") 134. The aft portion of the IFS 132 may be constructed as a core cowl. Bypass air from an engine fan may flow between the IFS 132 and the OFS 134 in a bypass air duct, and exits the duct at a nozzle formed generally between the IFS and OFS to provide the majority of the thrust. Nacelle 100 may comprise an exhaust nozzle 150. Exhaust nozzle 150 may surround a centerbody 160, between which the engine exhaust stream exits to provide additional thrust. The thrust reverser 130 may further be split into a left half 136 and a right half 138. The left half 136 and the right half 138 may be hinged to the pylon 140 at hinges 170. The left half 136 and the right half 138 may hinge open at hinges 170 in order to provide access to the engine.

Figure 2:
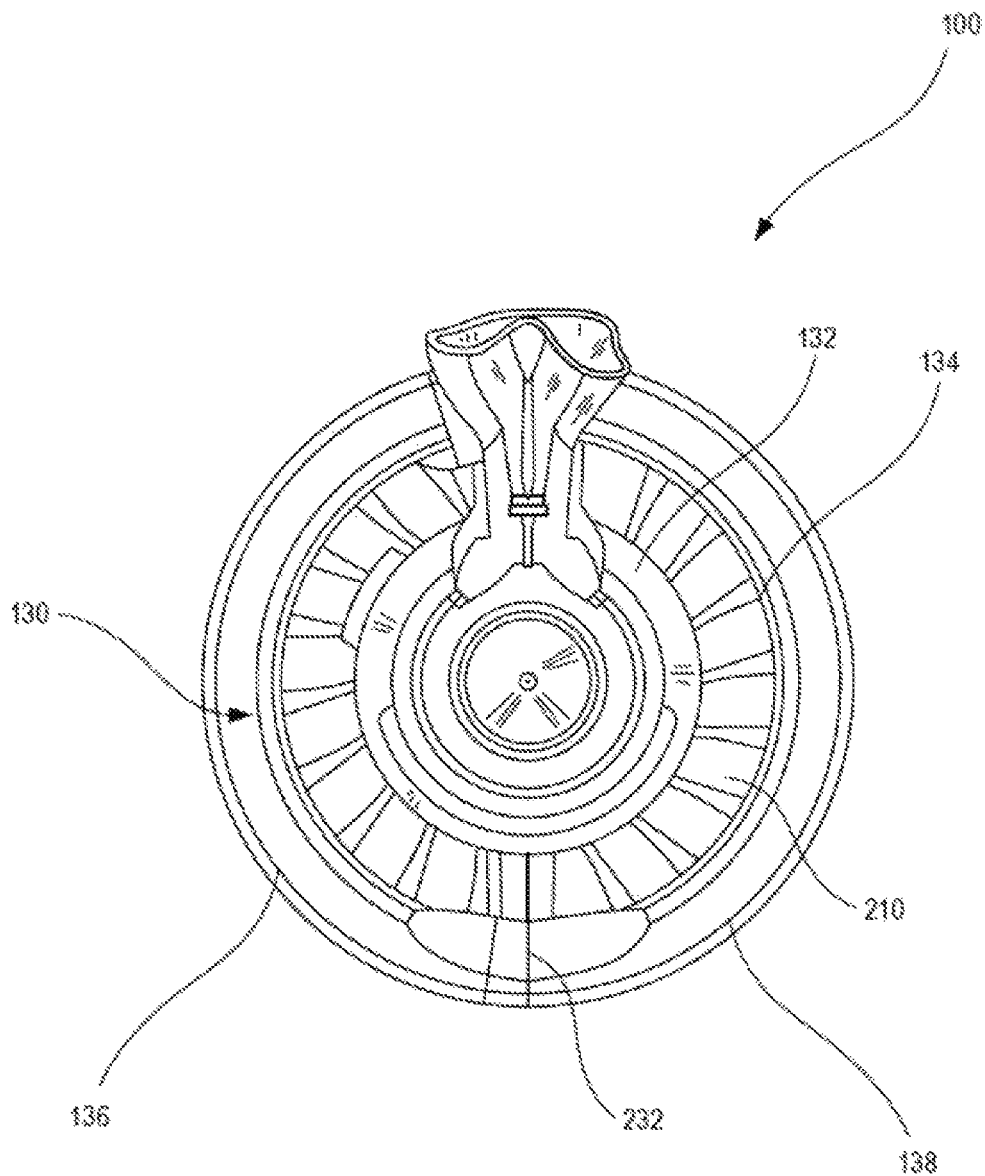
FIG. 2 illustrates an aft view of a nacelle in a closed position, in accordance with various embodiments.

Referring to FIG. 2, an aft view of nacelle 100 in a closed position is illustrated according to various embodiments. Left half 136 and right half 138 of thrust reverser 130 may be split along split line 232. Engine fan 210 is visible through the bypass air duct.

Figure 3:
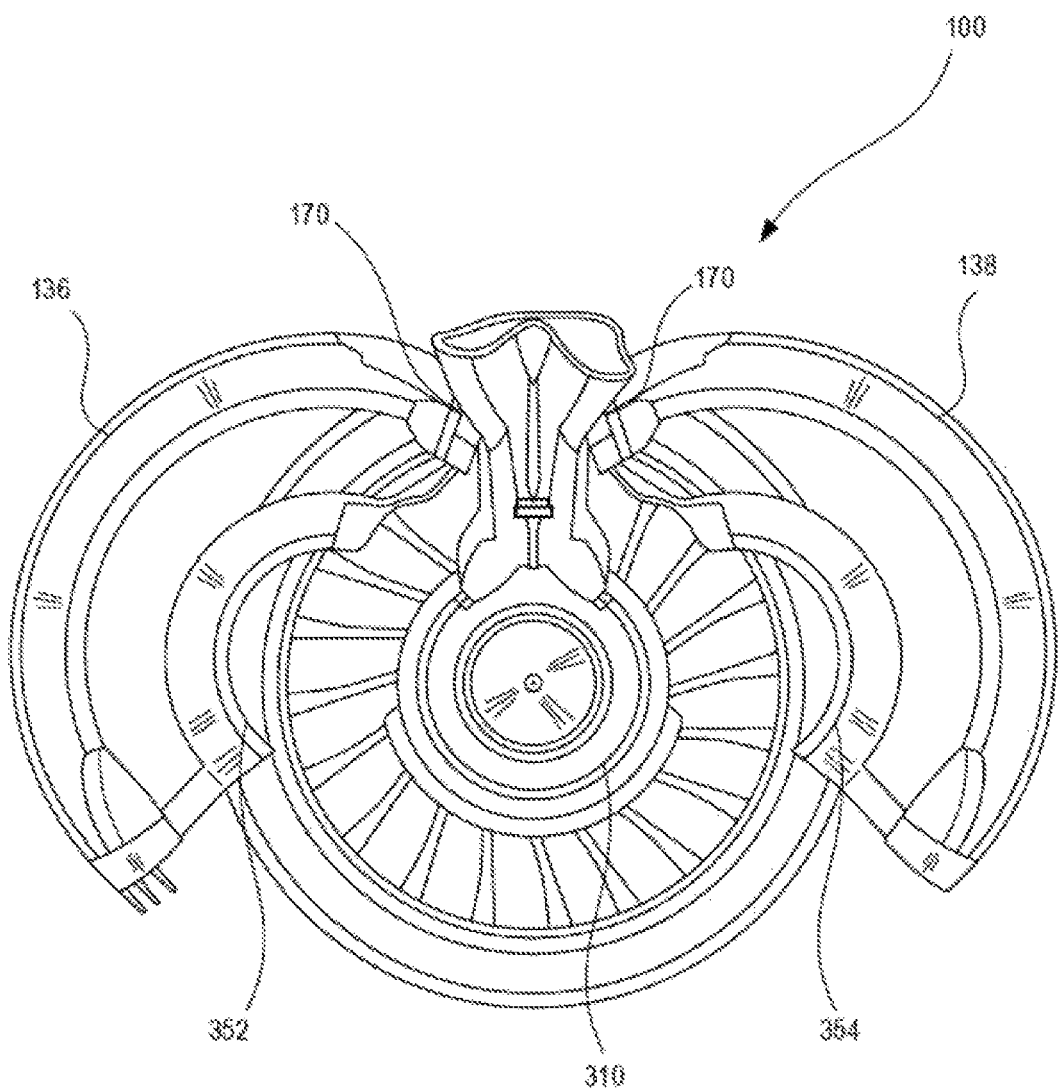
FIG. 3 illustrates an aft view of a nacelle in an open position, in accordance with various embodiments.

Referring to FIG. 3, an aft view of nacelle 100 with the thrust reverser halves 136, 138 hinged open is illustrated according to various embodiments. Thrust reverser halves 136, 138 and core cowl halves 352, 354 are hinged open at hinges 170 in order to provide access to engine 310.

Figure 4A:
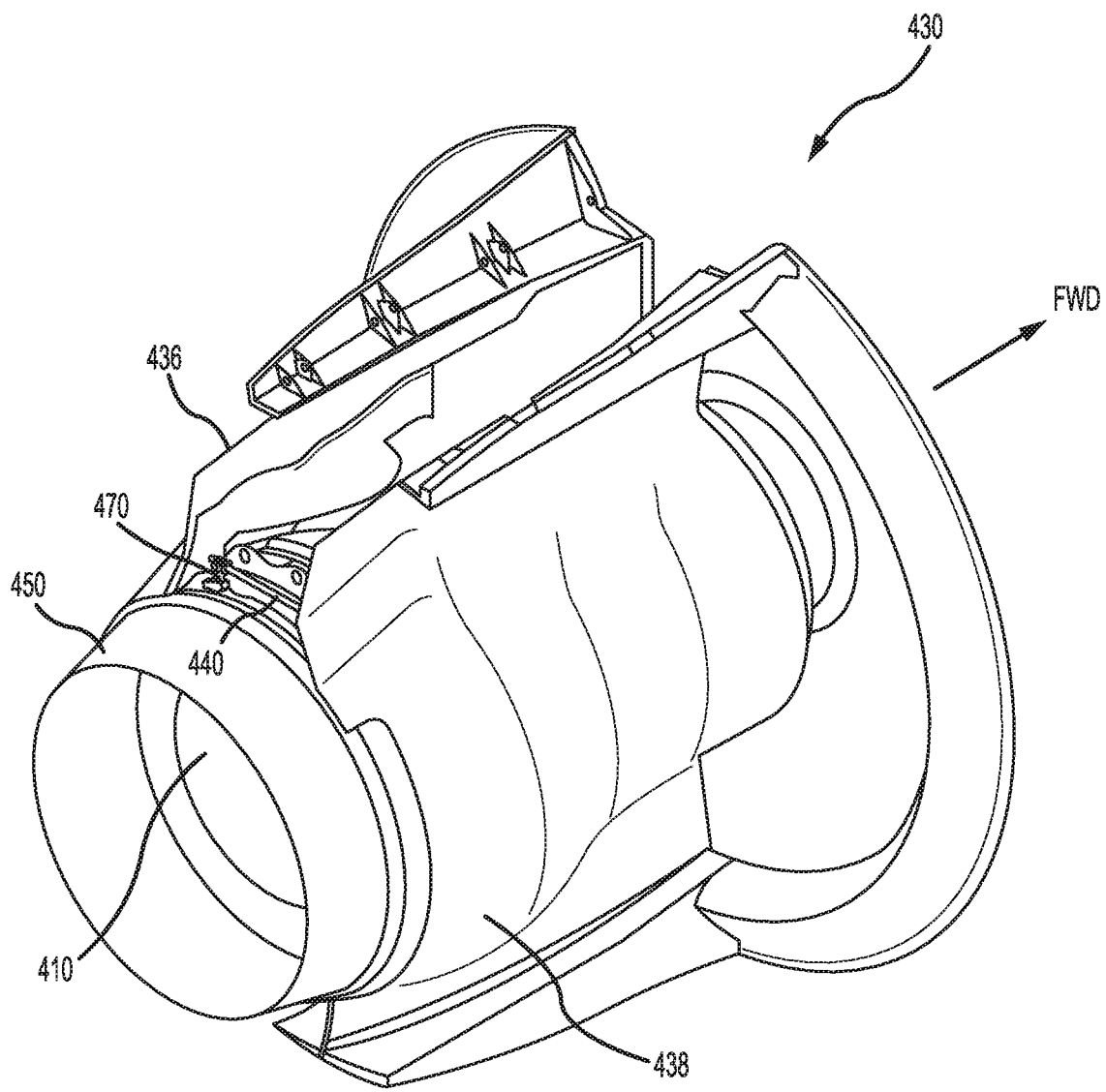
FIG. 4A illustrates a perspective view of a thrust reverser arrangement, in accordance with various embodiments.

Referring to FIG. 4A, a perspective view of a thrust reverser 430 is illustrated, which shows an exemplary location on thrust reverser 430 where a compression rod may be used. In various embodiments, thrust reverser 430 is similar to thrust reverser 130 of FIG. 1 through FIG. 3. The thrust reverser 430 may be split into a left half 436 and a right half 438. Thrust reverser 430 may surround an engine 410. An exhaust nozzle assembly 450 may be mounted to an aft end of engine 410. In various embodiments, one or more compression rods 440 may be located between thrust reverser halves 436, 438 and may transmit loads between thrust reverser halves 436, 438. Compression rod 440 may be configured to transmit loads between left half 436 and a right half 438. The compression rod 440 may be mounted within mounting brackets (also referred to herein as exhaust brackets), such as first mounting bracket 470 and second mounting bracket 471. The mounting brackets 470, 471 may be coupled to exhaust nozzle assembly 450.

Figure 4B:
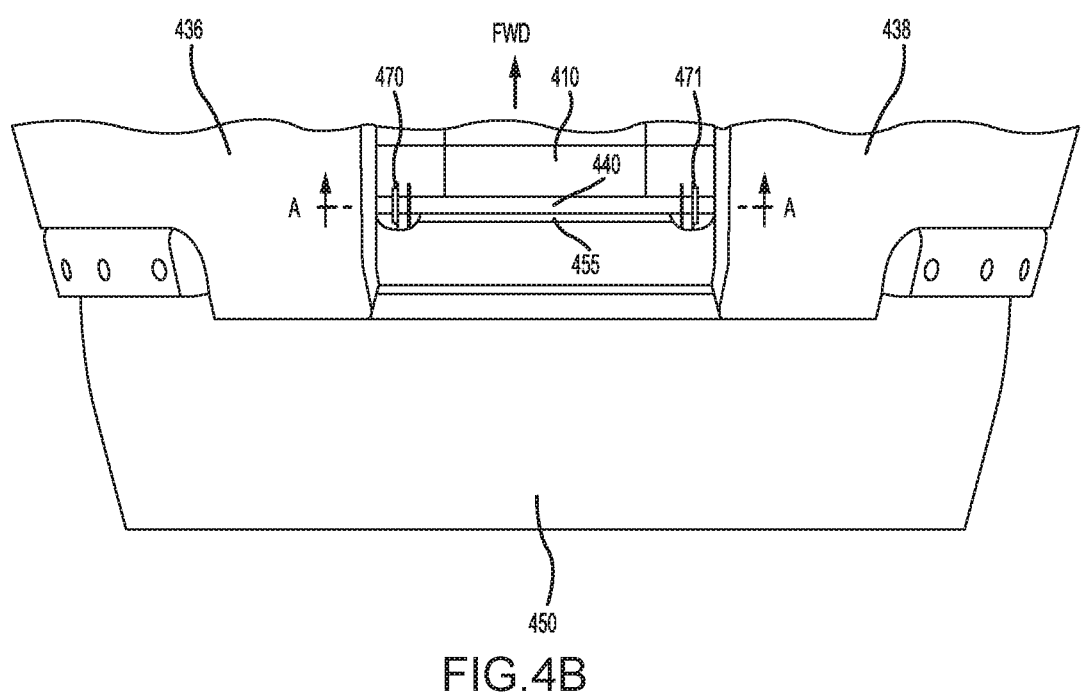
FIG. 4B illustrates an aft view of the thrust reverser arrangement of FIG. 4A, in accordance with various embodiments.

Referring to FIG. 4B, a top view of thrust reverser 430 is illustrated, in accordance with various embodiments. Exhaust nozzle assembly 450 may extend aft ward from engine 410. Exhaust nozzle assembly 450 may be mounted to engine 410 via an exhaust nozzle flange 455. In this regard, exhaust nozzle flange 455 may be located at an interface between exhaust nozzle assembly 450 and engine 410. The mounting brackets 470, 471 may be coupled to exhaust nozzle flange 455. In various embodiments, mounting brackets 470, 471 are bolted to exhaust nozzle flange 455. The centerline axis of apertures 472, 473 may be oriented generally perpendicular to the centerline axis of exhaust nozzle flange 455.

Figure 4C:
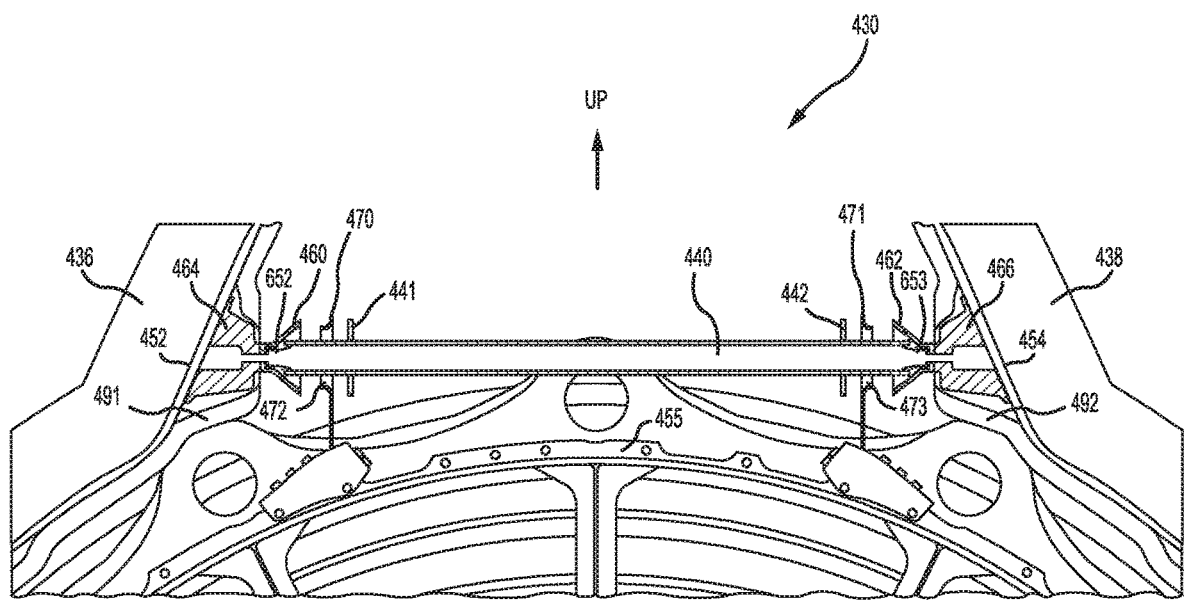
FIG. 4C illustrates a section view of the thrust reverser arrangement of FIG. 4B, in accordance with various embodiments.

Referring to FIG. 4C, section A-A of FIG. 4B of thrust reverser 430 is illustrated, in accordance with various embodiments. The compression rod 440 may contact left half 436 and a right half 438 at engagement features 460, 462. In various embodiments, engagement features 460, 462 may be engagement cones or similar geometric shape interfaces. Engagement features 460, 462 may be coupled respectively to left half 436 and right half 438.

In response to left half 436 and right half 438 of thrust reverser arrangement 430 hinging open, compression rod 440 may disengage from engagement features 460, 462. Compression rod 440 may be retained by mounting brackets 470, 471. Mounting brackets 470, 471 may comprise apertures 472, 473 which are larger in diameter than compression rod 440, which may allow movement of compression rod 440 within the limits of mounting brackets 470, 471. In response to left half 436 and right half 438 hinging closed, compression rod 440 may engage engagement features 460, 462. First mounting member 464 may be attached to left half 436. Engagement feature 460 may be coupled to first mounting member 464. Second mounting member 466 may be attached to right half 438. Engagement feature 462 may be coupled to second mounting member 466. First mounting member 464 may be attached to first core cowl half 452. Second mounting member 466 may be attached to second core cowl half 454. First and second core cowl halves 452, 454 may be similar to core cowl halves 352, 354 of FIG. 3.

Figure 5:
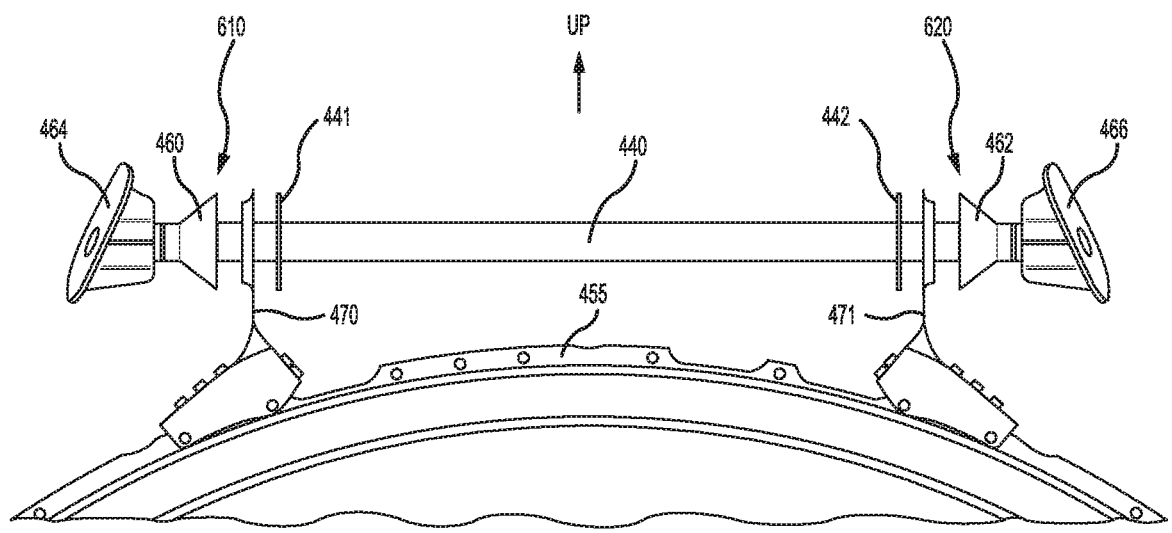
FIG. 5 illustrates an aft view of a compression rod arrangement coupled to an exhaust nozzle flange, in accordance with various embodiments.
Figure 6:
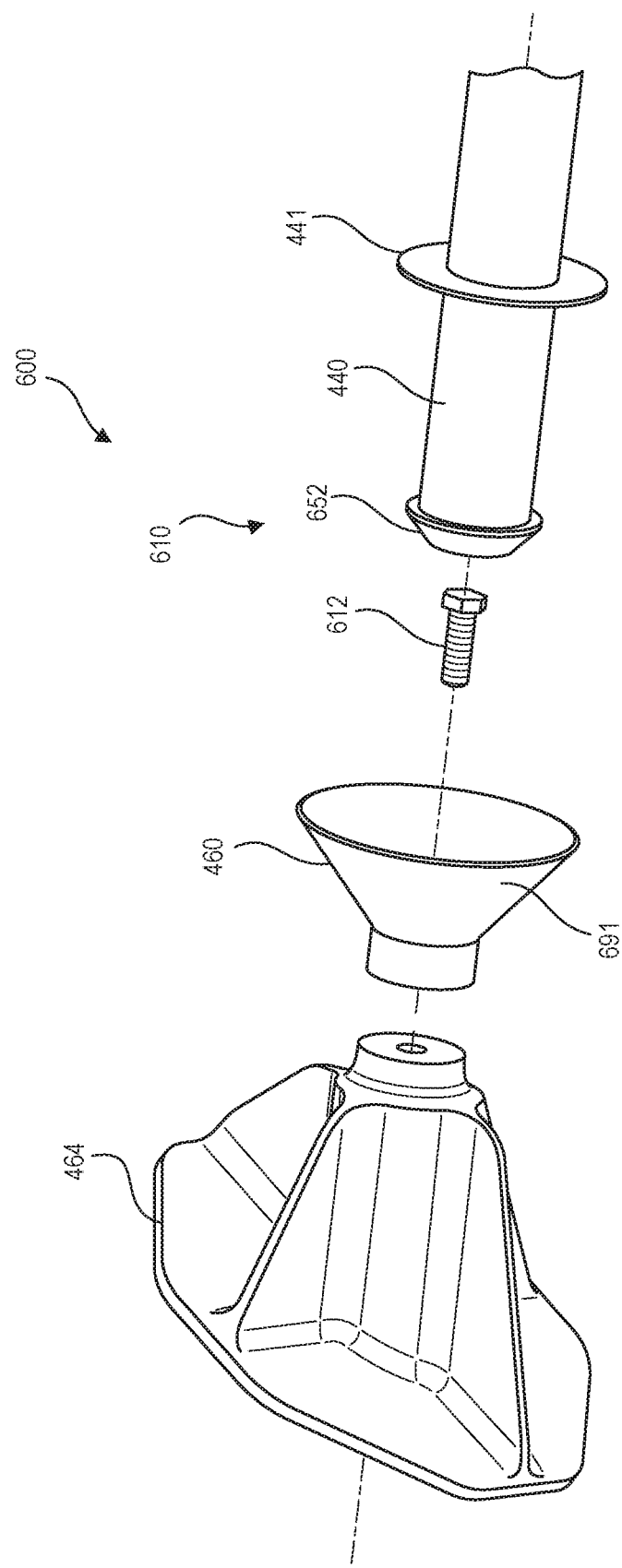
FIG. 6 illustrates an exploded view of a compression rod arrangement for a nacelle, in accordance with various embodiments.

Referring to FIG. 4C, FIG. 5, and FIG. 6, an arrangement 600 (also referred to herein as a compression rod arrangement) is illustrated, in accordance with various embodiments. Arrangement 600 may comprise engagement feature 460, a fastener 612, compression rod 440, and/or mounting member 464. Engagement feature 460 may be referred to as and/or comprises a bumper cup. Engagement feature 460 may comprise a conical geometry. Engagement feature 460 may comprise a cone 691. Fastener 612 may comprise a threaded fastener, such as a bolt, a screw, or the like. Engagement member 652 may be coupled to a first or second end of compression rod 440. Engagement member 652 may comprise a cap of compression rod 440. Engagement member 652 may be referred to as and/or comprise a button end. Fastener 612 may be configured to fasten engagement feature 460 to mounting member 464.

Compression rod 440 may comprise a first end 610 and a second end 620. Engagement member 652 may contact engagement feature 460 in response to arrangement 600 moving to a closed position. Stated another way, in response to an aircraft nacelle being in a closed position, the first end 610 may be in contact with first engagement feature 460 and the second end 620 may be in contact with second engagement feature 462 (see FIG. 4C). As illustrated, engagement member 652 may be perimetrically surrounded by first engagement feature 460 and engagement member 653 may be perimetrically surrounded by second engagement feature 462 when arrangement 600 is in a closed position.

In various embodiments, a second engagement member 653 may be attached to second end 620 of compression rod 440. A second engagement feature 462 may be fastened to second mounting member 466 via a second fastener. Second engagement member 653, second engagement feature 462, and second mounting member 466 may be similar to first engagement member 652, first engagement feature 460, and first mounting member 464, respectively.

In various embodiments, compression rod 440 comprises a first disc keeper 441. First disc keeper 441 may comprise a narrow flange extending from compression rod 440 in the form of a disc. First mounting bracket 470 may be disposed between first mounting member 464 and first disc keeper 441. Compression rod 440 may comprise a second disc keeper 442. Second disc keeper 442 may comprise a narrow flange extending from compression rod 440 in the form of a disc. Second mounting bracket 471 may be disposed between second mounting member 466 and second disc keeper 442. Stated differently, first disc keeper 441 and second disc keeper 442 may be disposed between first mounting bracket 470 and second mounting bracket 471. The maximum diameters of first disc keeper 441 and second disc keeper 442 may be greater than the maximum diameter of apertures 472, 473. In this manner, compression rod 440 may be retained in first mounting bracket 470 and second mounting bracket 471 in response to first and second core cowl halves 452, 454 moving to an open position (see FIG. 4D).

In various embodiments, a thermal blanket 491 is coupled to core cowl half 452 and a thermal blanket 492 is coupled to core cowl half 454. Thermal blankets 491, 492 may thermally protect core cowl halves 452, 454 from heat radiating from the core engine disposed within core cowl halves 452, 454 during operation. Thermal blanket 491 may cover first mounting member 464. Thermal blanket 491 may comprise an aperture sized with respect to first mounting member 464 such that a portion of first mounting member 464 extends through thermal blanket 491. In response to core cowl half 452 moving to an open position (see core cowl half 454 rotated toward an open position in FIG. 4D), thermal blanket 491 may remain fixed with respect to first mounting member 464. Likewise, to first mounting member 464 may remain fixed with respect core cowl half 452 in response to core cowl half 452 moving to an open position. In this manner, leakage of heat between thermal blanket 491 and first mounting member 464 is minimized. Thermal blanket 492 and second mounting member 466 may be arranged similar to thermal blanket 491 and first mounting member 464.

Figure 4D:
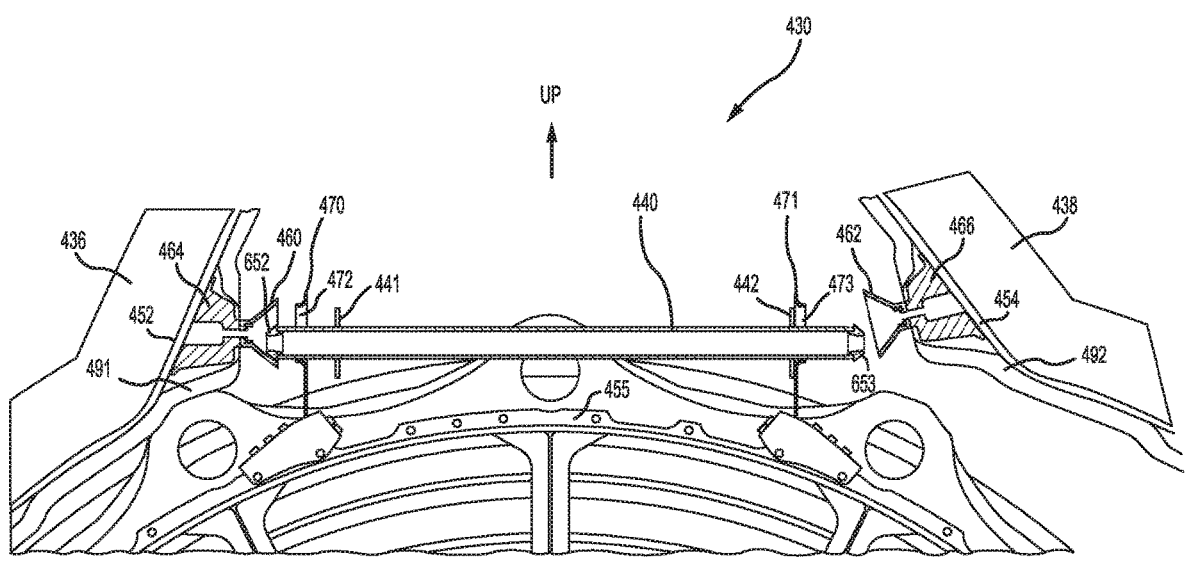
FIG. 4D illustrates the thrust reverser arrangement of FIG. 4C, with a core cowl half rotated toward an open position, in accordance with various embodiments.

With reference to FIG. 4D, thrust reverser 430 is illustrated with right half 438 rotated toward an open position. As right half 438 rotates toward an open position, compression rod 440 may slide away from engagement features 460, 462 and come to rest against mounting brackets 470, 471. In response to the left and right halves 436, 438 moving to closed positions (see FIG. 4C), the conical shape (or similarly shaped geometry) of engagement features 460, 462 assists in aligning the compression rod 440 with engagement features 460, 462. In this manner, the compression rod moves from being supported by mounting brackets 470, 471 to being supported by engagement features 460, 462 in response to left and right halves 436, 438 moving to closed positions.

Figure 7:
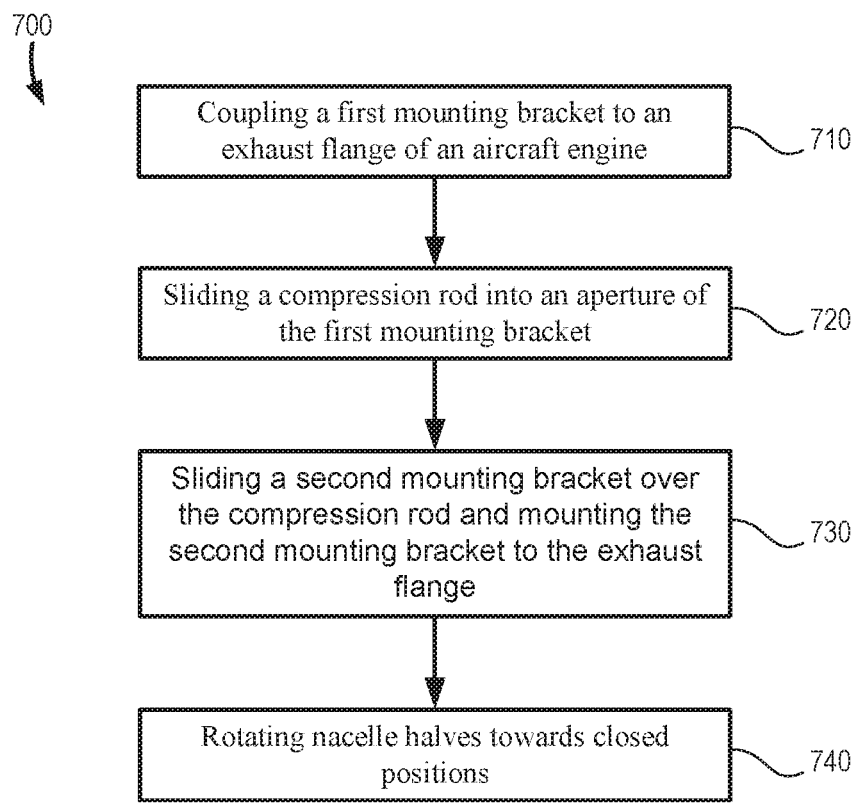
FIG. 7 illustrates a flow chart for a method for installing a compression rod, in accordance with various embodiments.

Referring to FIG. 7, a method 700 for installing a compression rod is illustrated, in accordance with various embodiments. Method 700 includes coupling a first mounting bracket to an exhaust flange of an aircraft engine (step 710). Method 700 includes sliding a compression rod into an aperture of the first mounting bracket (step 720). Method 700 includes sliding a second mounting bracket over the compression rod and mounting the second mounting bracket to the exhaust flange (step 730). Method 700 includes rotating nacelle halves towards closed positions (step 740).

With combined reference to FIG. 4C and FIG. 7, step 710 may include coupling first mounting bracket 470 to exhaust nozzle flange 455. First mounting bracket 470 may be coupled to exhaust nozzle flange 455 via a plurality of threaded fasteners, such as bolts. Step 720 may include sliding compression rod 440 to extend through aperture 472 of first mounting bracket 470. In this manner, a first end of compression rod 440 may be supported by first mounting bracket 470. In various embodiments, compression rod 440 is translated into first mounting bracket 470 until first disc keeper 441 engages (i.e., physically contacts) first mounting bracket 470. Step 730 may include sliding second mounting bracket 471 over the compression rod 440 (i.e., such that compression rod 440 extends through aperture 473 of second mounting bracket 471) and mounting the second mounting bracket 471 to the exhaust flange 455. Second mounting bracket 471 may be coupled to exhaust nozzle flange 455 via a plurality of threaded fasteners, such as bolts. In various embodiments, the first end of compression rod 440 is supported by first mounting bracket 470 while the second end is supported by hand and slid into second mounting bracket 471. Step 740 may include rotating first core cowl half 452 towards the closed position, as illustrated in FIG. 4C. Step 740 may include rotating second core cowl half 454 towards the closed position, as illustrated in FIG. 4C. Compression rod 440 may be compressed between first core cowl half 452 and second core cowl half 454 in response to first core cowl half 452 and second core cowl half 454 being rotated to the closed position.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An aircraft nacelle arrangement, comprising:
 a first half comprising a first engagement feature, and a second half comprising a second engagement feature, wherein the first half and the second half are rotatable about a hinge between a closed position in which the first half and the second half enclose a portion of an aircraft engine, and an open position in which the first half and the second half are separated and allow access to the portion of the aircraft engine;
 a compression rod comprising a first end and a second end, wherein in response to the aircraft nacelle arrangement being in the closed position, the first end is in contact with the first engagement feature and the second end is in contact with the second engagement feature; and
 a first mounting bracket coupled directly to an exhaust nozzle flange of the aircraft engine, wherein the compression rod extends through the first mounting bracket.

2. The aircraft nacelle arrangement of claim 1, further comprising a second mounting bracket coupled to the exhaust nozzle flange of the aircraft engine, wherein the compression rod extends through the second mounting bracket.

3. The aircraft nacelle arrangement of claim 2, wherein the second mounting bracket is disposed circumferentially from the first mounting bracket.

4. The aircraft nacelle arrangement of claim 1, further comprising:
 a first engagement member coupled to the first end; and
 a second engagement member coupled to the second end.

5. The aircraft nacelle arrangement of claim 4, wherein in response to the first half being rotated about the hinge to the closed position, the first engagement member is configured to engage the first engagement feature and in response to the second half being rotated about the hinge to the closed position, the second engagement member is configured to engage the second engagement feature.

6. The aircraft nacelle arrangement of claim 5, wherein at least one of the first engagement member and the second engagement member comprise at least one of a cap or a button end.

7. The aircraft nacelle arrangement of claim 1, wherein the first engagement feature comprises a first cone coupled to the first half, and wherein the second engagement feature comprises a second cone coupled to the second half.

8. The aircraft nacelle arrangement of claim 1, wherein the first mounting bracket extends radially outward from the exhaust nozzle flange.

9. An arrangement for an aircraft nacelle, comprising:
a turbine engine;
an exhaust assembly coupled to the turbine engine, the exhaust assembly extends aft ward from the turbine engine;
an exhaust nozzle flange, whereby the exhaust assembly is coupled to the turbine engine;
a compression rod disposed radially from the exhaust nozzle flange; and
a first mounting bracket coupled directly to the exhaust nozzle flange, wherein the compression rod extends through the first mounting bracket.

10. The arrangement of claim 9, further comprising a second mounting bracket coupled to the exhaust nozzle flange, wherein the compression rod extends through the second mounting bracket.

11. The arrangement of claim 10, wherein the second mounting bracket is disposed circumferentially from the first mounting bracket.

12. The arrangement of claim 9, further comprising:
a first engagement member coupled to a first end of the compression rod; and
a second engagement member coupled to a second end of the compression rod.

13. The arrangement of claim 12, wherein at least one of the first engagement member and the second engagement member comprise at least one of a cap or a button end.

14. The arrangement of claim 9, wherein the first mounting bracket extends radially outward from the exhaust nozzle flange.

15. The arrangement of claim 12, further comprising a first half comprising a first engagement feature, and a second half comprising a second engagement feature, wherein the first half and the second half are rotatable about a hinge between a closed position in which the first half and the second half enclose a portion of the turbine engine, and an open position in which the first half and the second half are separated and allow access to the portion of the turbine engine.

16. The arrangement of claim 15, wherein in response to the first half being rotated about the hinge to the closed position, the first engagement member is configured to engage the first engagement feature and in response to the second half being rotated about the hinge to the closed position, the second engagement member is configured to engage the second engagement feature.

17. The arrangement of claim 16, wherein the first engagement feature comprises a first cone coupled to the first half, and wherein the second engagement feature comprises a second cone coupled to the second half.

18. A method for installing a compression rod, comprising:
coupling a first mounting bracket directly to an exhaust nozzle flange of an aircraft engine; and
disposing the compression rod to extend through the first mounting bracket.

19. The method of claim 18, further comprising:
coupling a second mounting bracket to the exhaust nozzle flange; and
disposing the compression rod to extend through the second mounting bracket.

20. The method of claim 18, further comprising:
rotating a first half towards a closed position; and
rotating a second half towards the closed position,
wherein the compression rod is compressed between the first half and the second half in response to the first half and the second half being rotated to the closed position.

* * * * *